US009483604B1

(12) United States Patent
Foreman et al.

(10) Patent No.: US 9,483,604 B1
(45) Date of Patent: Nov. 1, 2016

(54) VARIABLE ACCURACY PARAMETER MODELING IN STATISTICAL TIMING

(71) Applicant: International Business Machines Corporation, Armonk, NY (US)

(72) Inventors: Eric A. Foreman, Fairfax, VT (US); Jeffrey G. Hemmett, St. George, VT (US); Kerim Kalafala, Rhinebeck, NY (US); Gregory M. Schaeffer, Poughkeepsie, NY (US); Stephen G. Shuma, Underhill, VT (US); Alexander J. Suess, Hopewell Junction, NY (US); Chandramouli Visweswariah, Croton-on-Hudson, NY (US); Michael H. Wood, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/739,279

(22) Filed: Jun. 15, 2015

(51) Int. Cl.
  *G06F 9/455* (2006.01)
  *G06F 17/50* (2006.01)

(52) U.S. Cl.
  CPC ....... *G06F 17/5081* (2013.01); *G06F 17/5031* (2013.01); *G06F 17/5036* (2013.01)

(58) Field of Classification Search
  CPC ........... G06F 17/5081; G06F 17/5031; G06F 17/5036
  See application file for complete search history.

(56) References Cited

U.S. PATENT DOCUMENTS

| | | | |
|---|---|---|---|
| 8,839,167 | B1 | 9/2014 | Dreibelbis et al. |
| 2007/0266357 | A1 | 11/2007 | Kimata et al. |
| 2007/0277134 | A1* | 11/2007 | Zhang ................. G06F 17/5031 716/113 |
| 2007/0283305 | A1 | 12/2007 | Reddy et al. |
| 2009/0024974 | A1 | 1/2009 | Yamada |
| 2009/0288051 | A1* | 11/2009 | Hemmett ............ G06F 17/5031 716/113 |
| 2012/0284680 | A1 | 11/2012 | Iyer et al. |
| 2014/0096099 | A1* | 4/2014 | Phillips ............... G06F 17/5036 716/113 |
| 2014/0129244 | A1 | 5/2014 | Joseph et al. |

FOREIGN PATENT DOCUMENTS

| | | |
|---|---|---|
| GB | 2359960 A | 9/2001 |
| WO | 2006102027 A1 | 9/2006 |

OTHER PUBLICATIONS

"Accurate Waveform-based Timing Analysis", by Christoph Knoth, Aug. 27, 2012.*
Khandelwal et al., "A General Framework for Accurate Statistical Timing Analysis Considering Correlations", ACM 1-59593-058-2/05/0006, Jun. 13-17, 2005, pp. 89-94.

* cited by examiner

*Primary Examiner* — Nha Nguyen
(74) *Attorney, Agent, or Firm* — Gibb & Riley, LLC; Steven J. Meyers, Esq.

(57) ABSTRACT

Systems and methods compute a mean timing value of an integrated circuit design for variables using a first timing calculation of relatively higher accuracy; and calculate a first timing value of the integrated circuit design for the variables, using a second timing calculation having a relatively lower accuracy. Such systems and methods calculate second timing values of the integrated circuit design for additional sets of variables using the second timing calculation; and calculate finite differences of each of the second timing values to the first timing value. Thus, these systems and methods calculate a statistical sensitivity of the first timing value to the additional sets of variables based on the finite differences. Further, such systems and methods calculate a statistical sensitivity of the mean timing value to the additional sets of values based on the statistical sensitivity of the first timing value to the additional sets of values.

14 Claims, 7 Drawing Sheets

VARIABLE ACCURACY PARAMETER MODELING IN STATISTICAL TIMING

BACKGROUND

The present invention relates to static timing analysis, and more specifically, to using variable accuracy parameter modeling in statistical static timing analysis.

One form of performance analysis that is used during integrated circuit (IC) design is static timing analysis (STA). Static timing analysis identifies circuit races/hazards that could cause a chip to malfunction, verifies the operational speed of a chip, and identifies the paths, which limit the operational speed of the integrated circuit. Static timing analysis typically operates on a timing graph, in which graph nodes represent electrical nodes (e.g., circuit pins) where signals may make transitions at various times; and in which graph edges, or segments, representing the delays of the circuits and/or wires connecting the nodes. Although static timing analysis may report performance-limiting paths, typical static timing analysis methods may not actually operate on paths (of which there may be an exponentially large number), and instead can be "block-based" to compute and propagate forward signal arrival times reflecting the earliest and/or latest possible times that signal transitions can occur at nodes in the timing graph. As a result, static timing analysis is efficient, allowing for rapid estimation of circuit timing on very large designs as compared to other approaches (e.g., transient simulation).

One aspect of static timing analysis is evaluation of timing tests, which are ordering relationships between the arrival times of signals on converging paths. These are often represented in a timing graph as test edges, or segments. Common examples of timing tests are setup tests, requiring that a data signal at an input of a flip-flop or other memory element becomes stable for some setup period before the clock signal transition that stores that data (i.e., that the latest possible data transition in a clock cycle occur at least the required setup period before the earliest possible clock transition for that cycle); and hold tests, requiring that a data signal at an input of a flip-flop or other memory element remain stable for some hold period before the clock signal transition that stores that data (i.e., that the earliest possible data transition in a clock cycle occur at least the required hold period after the latest possible clock transition for the preceding clock cycle). Pairs of paths along which early and late arrival times compared in a timing test are propagated are often referred to as racing paths.

It is commonly recognized that electrical characteristics of transistors and interconnects are not the same for different IC chips and even for the same chip at different periods of time or chip locations. Variation of electrical characteristics can be due to variation of process parameters, changing of environmental conditions and even chip age (e.g., Hot Carriers Injections, Negative Bias Temperature Instability, electromigration, and so forth). The variation of electrical characteristics results in variations of gate timing characteristics. Traditional deterministic static timing analysis may typically be performed at a particular "corner," which is a specified combination of conditions such as voltage, temperature, and manufacturing process (PVT) that affect delays of circuits on a chip. However, the timing results can vary widely between corners as changes in temperature, voltage, process, etc., can have a strong affect on the delays through the chip components. The traditional conservative way to handle these variations is to perform multiple static timing analysis runs at all so-called process corners at which the gates may have the worst combinations of delays, sometimes referred to as base corners. In other words, base corners may be best case, nominal, and worst case settings for variables (such as PVT, etc.). Then chips are designed so that they can properly function at all process corners assuming that as a result they will function at any other combination of gate delays.

However, with decreasing transistor size and interconnect width, the variation of electrical characteristics is becoming proportionally larger. Therefore, the multi-corner analysis approach results in too conservative and non-optimal designs because most design efforts and chip resources are spent to make chips function at very low-probability combinations of electrical characteristics. Additionally, the fixing of failed timing tests in one process corner may lead to new timing test failures in other corners, requiring a costly iterative design process. An alternative approach to designing chips is to consider actual statistical characteristics of process parameter variations and use them to compute statistical characteristics of a designed circuit. This approach is referred to as the Statistical Static Timing Analysis (SSTA) approach.

There are various categories of SSTA processes: path-based and block-based methods. A path-based SSTA process sums gate and wire delays on specific paths. The statistical calculation uses less computing resources, but the paths of interest are identified prior to running the analysis, which takes time, and there is the potential that some other paths may be relevant but not analyzed so path selection is important. A block-based SSTA process generates the arrival times for each node, working from the clocked elements. The advantage of a block-based SSTA process is completeness, and there is no need for path selection. One issue with SSTA is that a statistical max (or min) operation, that also considers correlation, would be useful; however, this is a difficult technical problem to achieve.

Statistical static timing analysis explicitly propagates mean timing values and sensitivities of these mean timing values to sources of variation through the timing graph, based on modeled variability information contained in asserted timing constraints and the delay models. These sensitivities may then cancel when arrival time differences are computed at test slack calculation time, providing pessimism reduction during the original block based timing analysis. Statistical min/max operations are used to compute the early and late mode arrival times, respectively, when paths converge, including computing both new mean values and sensitivities to various parameters. As the distributions propagated represent functions rather than discrete numerical values, operations such as addition and subtraction, and in particular max and min, can be very computationally extensive and expensive as compared to traditional deterministic timing. While the individual runs are more costly, the net cost can be less than multiple single corner runs, which may also minimize design iterations as any fixes that occur may be applicable across the full process space covered. Regardless of the timing approach used, the runtime required to perform timing analysis impacts the number of design iterations, and there is strong interest in keeping the runtime to a minimum. Therefore, methods that can reduce runtime while maintaining timing accuracy are desirable.

Thus, there are many recognized methods for modeling data (delays, slews, loads, etc.) in a static timing environment. Each method involves trade-offs; the most frequently discussed being a balance between accuracy and turn-around time (TAT)/memory consumption by the static timer. Static timing tools/flows strive for improved accuracy, since this reduces required margining and reduces overall risk of chip design. However, time-to-market is an equally powerful driver of design, and turn-around time of each step (and iterations of said step) in the design flow is a driver of time-to-market. These competing forces drive electronic design analysis and design teams to choose a balance point between accuracy and turn-around time.

Statistical static timing analysis is not immune to these decisions. In fact, the turn-around time impact of more accurate modeling is magnified by the number of operations required for sensitivity calculations (e.g., via finite differencing). Thus, for statistical static timing analysis, a proper turn-around time-accuracy balance is very useful.

SUMMARY

In view of the foregoing, disclosed herein are methods and computer program products embodiments that perform statistical static timing analysis for an integrated circuit design. These methods and computer program products compute at least one mean timing value of the integrated circuit design using a relatively high-accuracy timing calculation; and compute at least one statistical sensitivity of at least one mean timing value by taking a finite difference of relatively lower-accuracy timing calculations.

The relatively high-accuracy timing calculations comprise at least one of: current source modeling of circuit delay and slew, Simulation Program with Integrated Circuit Emphasis (SPICE) modeling, input pin capacitance (pincap) modeling as a function of manufacturing process variations, and full effective capacitance (Ceff) calculation. The relatively lower accuracy timing calculation comprises at least one of: tabular modeling of circuit delay and slew, base corner capacitance used for perturbed corners, base corner effective capacitance used for perturbed corners, and lumped capacitance modeling.

Also, these methods can perform the higher accuracy modeling for selected sensitivities, based on a pre-determined accuracy impact; or for physical elements of the integrated circuit design subject to relatively increased accuracy requirements, hierarchical elements of the integrated circuit design subject to relatively increased accuracy requirements, etc. Such higher accuracy computations can include sensitivities, cross-terms, and opposite corner values.

More particularly, in other embodiments disclosed herein, the methods and computer program products perform statistical static timing analysis. The computer program products comprise a computer readable storage medium that has program instructions embodied therewith, and wherein the computer readable storage medium is not a transitory signal per se. These program instructions are readable and executable by a computer to cause the computer to perform methods that receive an integrated circuit design into the computer.

Furthermore, the methods automatically compute a mean timing value of at least one portion of the integrated circuit design for a first set of manufacturing process variables, voltage variables, and temperature variables (PVT variables), using a first timing calculation, which has a first accuracy and has a first time and computer resource cost, processed using the computer. The methods also automatically calculate another timing value (e.g., a "first" timing value) of the same portion of the integrated circuit design for the same first set of PVT variables, but this time using a second timing calculation (again, processed using the computer). The first timing calculation and the second timing calculation are different circuit timing models. The second timing calculation has a second accuracy that is lower than the first accuracy, and has a second time and computer resource cost that is also lower than the first time and computer resource cost. The first time and computer resource cost and the second time and computer resource cost that can include, for example, turn-around-time (TAT).

The methods furthermore automatically calculate second timing values of the portion of the integrated circuit design for additional sets of PVT variables that are different from the first set of PVT variables, again using the second timing calculation. The process of calculating the second timing values can use the first timing calculation for selected sets of the additional sets of PVT values, based on the impacted accuracy of the statistical sensitivity of the first timing value, based on the physical elements of the integrated circuit design subject to relatively increased accuracy requirements, or based on hierarchical elements of the integrated circuit design subject to relatively increased accuracy requirements.

The methods then automatically calculate the finite differences of each of the second timing quantities to the first timing value using the computer, and automatically calculate a statistical sensitivity of the first timing value to the additional sets of PVT variables based on such finite differences. These methods then automatically calculate a statistical sensitivity of the mean timing value to the additional sets of PVT values (based on the statistical sensitivity of the first timing value to the additional sets of PVT values). In other words, this process determines the distribution of the statistical sensitivity of the first timing value to the additional sets of PVT values, and then this process centers the distribution of the statistical sensitivity of the first timing value to the additional sets of PVT values on the mean timing value.

The methods then output the statistical sensitivity of the mean timing value to the additional sets of PVT values from the computer. For example, such methods can output a graph that shows the distribution of the statistical sensitivity of the mean timing value to the additional sets of PVT values centered on the mean timing value.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

Figure 1:
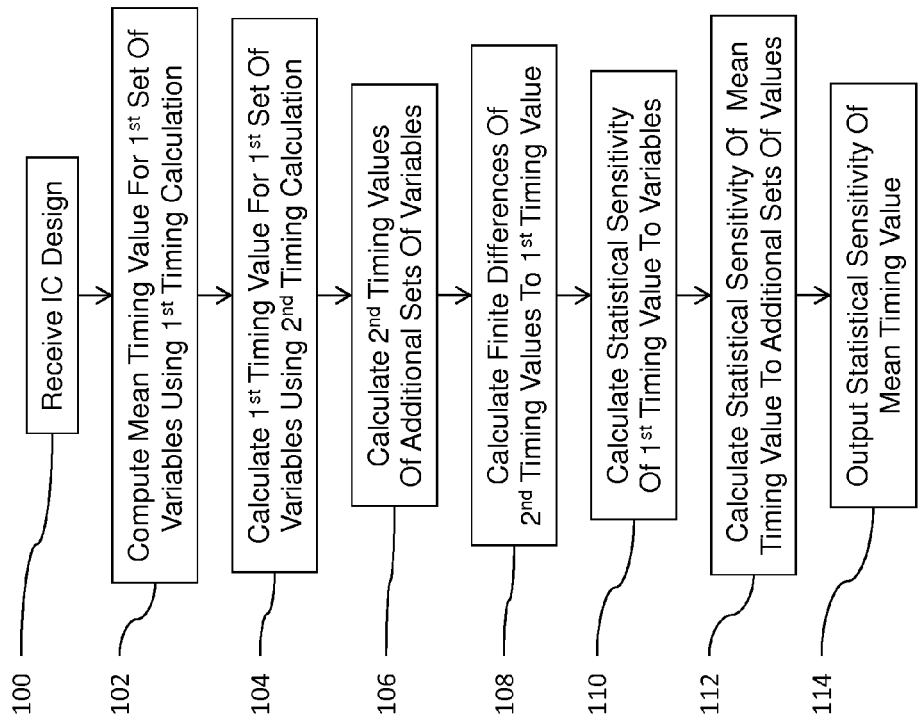
FIG. 1 is a flowchart diagram illustrating aspects of systems and methods herein.

As mentioned above, time-to-market is a powerful driver of IC design, and turn-around time of each step in a design flow (and iterations of those steps) naturally influences time-to-market. These competing imperatives force EDA development and IC design teams to continually strike balances between turn-around time and accuracy. In statistical static timing analysis tools and flows, the turn-around time impact of increased accuracy is magnified by the number and complexity of operations required (e.g., finite differencing for sensitivity calculations).

In view of this, the methods and systems herein use a higher accuracy modeling (and slower turn-around time) approach for "first order" (e.g., base corner/mean) calculations in a statistical static timing analysis environment, and a lower accuracy (and faster turn-around time) approach for the "higher order" (e.g., sensitivity, cross-term) calculations. In this manner, the first order accuracy improvement is gained, without paying the full turn-around time penalty of using high accuracy modeling for all calculations.

The accuracy loss in the higher order terms is acceptable in view of the decreased turnaround time. For example, if the mean value is off by 5 units, the answer will be off by 5 units. If both calculations of a finite difference operation are off by 5 units, the error in the resulting sensitivity (and hence the answer) will be greatly reduced.

For example, three exemplary methods for modeling IP in a static timer include Simulation Program with Integrated Circuit Emphasis (SPICE) modeling, which is rarely used in industry (which is the most accurate but has prohibitive turn-around time); tabular (e.g., NLDM), which is popular, has moderate accuracy, and good turn-around time; Current Source Modeling (e.g., CCS, ECSM), which is growing in popularity, has improved accuracy over NLDM (especially for slews, pincaps, and RC) but is not as accurate as SPICE, and has a worse turn-around time than NLDM (but better than SPICE) which is an overall deterrent to its use.

Timing characterization has become an extremely technical problem for the Electronic Design Automation (EDA) industries. Techniques like non-linear delay modeling (NLDMs) have been conventionally used for modeling the delay of the digital gates. For a given technology model and for a given process corner, the conventional NLDM characterization characterizes the delay and output slew of the gate in a lookup table which stores the delay and output slew of the gate for a particular voltage, input slew, and output load capacitance. The delay of the gate corresponding to different input slews (rising/falling) are computed with different output loading capacitances (Ceff) using SPICE and stored in a 2-dimensional lookup table. During the timing analysis, whenever a particular gate is encountered, first a Ceff is computed from the corresponding output loading. Both the Ceff value and the input slew at the gate are used to look up the delay value from NLDM look-up table using non-linear approximations.

The technical problem of accurate modeling of cell has become acute at advanced technology nodes. Several effects such as multiple input switching, nonlinear pin capacitance, etc., are showing major impact at advanced technology nodes. Owing to the highly resistive interconnect and noisy waveforms, table lookup techniques like NDLM that have been used to predict the gate delay for a given input slew and output loading capacitance (Ceff) are no longer able to estimate accurate delays, thereby resulting in the technical problem of high errors during the timing analysis of digital designs.

Constant pin capacitance models no longer accurately describe the loading contribution of an input pin to the total load as seen by the source terminal of the interconnect network. Generally speaking, the gate input pin impedance may vary during the voltage transition at the input pin of the gate. In addition, its value is dependent on the loading condition at the output pin of that gate. Present industry standard gate current-source models offer two ways of modeling gate input pin capacitances: 1) the Effective Current Source Model (ECSM) format which models the input pin capacitance as a function of Slew and Output capacitive Load, and 2) the Composite Current Source (CCS) format that employs a two-piece pin capacitance model for each input slew/output capacitance combination. Both these models are table-based representations.

Assuming a baseline statistical static timing analysis flow utilizes NLDM to model 6 parameters (one base corner and five sources of variation), the baseline turn-around time point is 6 NLDM calculations (one base corner, and five perturbed corners used to determine finite difference of a sensitivity for each source of variation). If increased accuracy of ECSM modeling is desired, one approach to gain ECSM accuracy would be to replace the NLDM models with ECSM, and move all calculations to use these models. The turn-around time comparison point for this approach is 6 ECSM calculations, which may result in unacceptable turn-around time.

In view of this, methods and systems herein provide a statistical static timing analysis flow that uses higher-accuracy modeling (e.g., ECSM) for the base corner calculation, and relatively lower-accuracy modeling (e.g., NLDM) for the sensitivity calculations. Note that the base corner still is calculated using NLDM (in addition to ECSM), to enable valid finite-difference pairings of the base corner with the perturbed corners (which use NLDM only). In one example, the net turn-around time addition in this flow over the baseline flow is 1 ECSM calculation. Thus, as long as the turn-around time of 6 NLDM calculations plus 1 ECSM calculation is less than 6 ECSM calculations (alternatively, 1[ECSM]<6[ECSM−NLDM]), there is a net benefit in turn-around time. This simple example shows the turn-around time 'trade-off point' for the systems and methods herein using different accuracy models. Generalizing this equation for N sources of variation (which drives N+1 calculations): (N+1) [NLDM]+1[ECSM]<(N+1) [ECSM]. Solving for N: N>1/([ECSM]/[NLDM]−1) and generalizing further: N>1/([HighAccuracyturn-around time]/[LowAccuracyturn-around time]−1).

To provide some examples, the systems and methods herein can calculate pincap for the base corner, and use that pincap for perturbed corners; can perform a Ceff calculation for the base corner, and use that Ceff for perturbed corners; can perform a Ceff calculation for the base corner, and use a lumped load for perturbed corners; can selectively apply higher accuracy modeling for certain perturbed corners, based on pre-determined accuracy impact (while using lower accuracy modeling for other perturbed corners); can selectively apply higher accuracy modeling for physical geometry of design (i.e., metal layers allocated for clocks where higher accuracy is necessary); can selectively apply higher accuracy modeling for hierarchical elements (e.g., voltage island requires higher accuracy and exists within a hierarchical boundary); etc.

Thus, the systems and methods herein use variable accuracy parameter modeling in statistical static timing analysis, which provides highly accurate analysis with acceptable turn-around time. In other words, the systems and methods herein use higher accuracy (and higher turn-around time) modeling approaches for 'first order' computations in a statistical static timing analysis environment (e.g., mean/base corner values); and use relatively lower accuracy (and lower turn-around time) modeling approaches for 'higher order' computations (such as sensitivities, cross-terms, opposite corner values, etc.). By using high accuracy approaches for 'first order' computations, but allowing lower accuracy approaches for 'higher order' computations, the systems and methods herein get the most of the final accuracy benefit without paying the full turn-around time and computer resource cost.

Thus, as noted above, as statistical static timing analysis gains traction in the industry, (e.g., design content continues to grow, and technology challenges increase) the technical problem of turn-around time-accuracy trade-offs will become more impactful. The systems and methods herein provide a new and valuable method for improving accuracy in statistical static timing analysis, while balancing turn-around time impacts.

This processing is shown in flowchart form in FIG. 1. More specifically, the computerized device receives the integrated circuit design, as shown in item 100. The methods then, in item 102, automatically compute a mean timing value of at least one portion of the integrated circuit design for a first set of manufacturing process variables, voltage variables, and temperature variables (PVT variables), using a first timing calculation. The first timing calculation has a first accuracy and has a first time and computer resource cost, processed using the computer.

In item 104, the methods also automatically calculate another timing value (e.g., a "first" timing value) of the same portion of the integrated circuit design for the same first set of PVT variables, but this time using a second timing calculation (again, processed using the computer). The first timing calculation and the second timing calculation are different circuit timing models. The second timing calculation has a second accuracy that is lower than the first accuracy, but has a second time and computer resource cost that is also lower than the first time and computer resource cost. The first time and computer resource cost and the second time and computer resource cost that can include, for example, turn-around-time (TAT).

As shown in item 106, these methods automatically calculate second timing values of the portion of the integrated circuit design for additional sets of PVT variables that are different from the first set of PVT variables, again using the second timing calculation. The process of calculating the second timing values in item 106 can use the first timing calculation for selected sets of the additional sets of PVT values, based on the impacted accuracy of the statistical sensitivity of the first timing value, based on the physical elements of the integrated circuit design subject to relatively increased accuracy requirements, or based on hierarchical elements of the integrated circuit design subject to relatively increased accuracy requirements.

The methods then automatically calculate the finite differences of each of the second timing quantities to the first timing value using the computer, in item 108. Then, in item 110, these methods can automatically calculate a statistical sensitivity of the first timing value to the additional sets of PVT variables based on such finite differences found in item 108.

In item 112, these methods then automatically calculate a statistical sensitivity of the mean timing value to the additional sets of PVT values (based on the statistical sensitivity of the first timing value to the additional sets of PVT values). In other words, in item 112, these processes determine the distribution of the statistical sensitivity of the first timing value to the additional sets of PVT values (in item 110) and then this processing in item 112 centers the distribution of the statistical sensitivity of the first timing value to the additional sets of PVT values on the mean timing value.

The methods then output the statistical sensitivity of the mean timing value to the additional sets of PVT values from the computer in item 114. For example, in item 114, such methods can output a graph that shows the distribution of the statistical sensitivity of the mean timing value to the additional sets of PVT values centered on the mean timing value.

Figure 2:
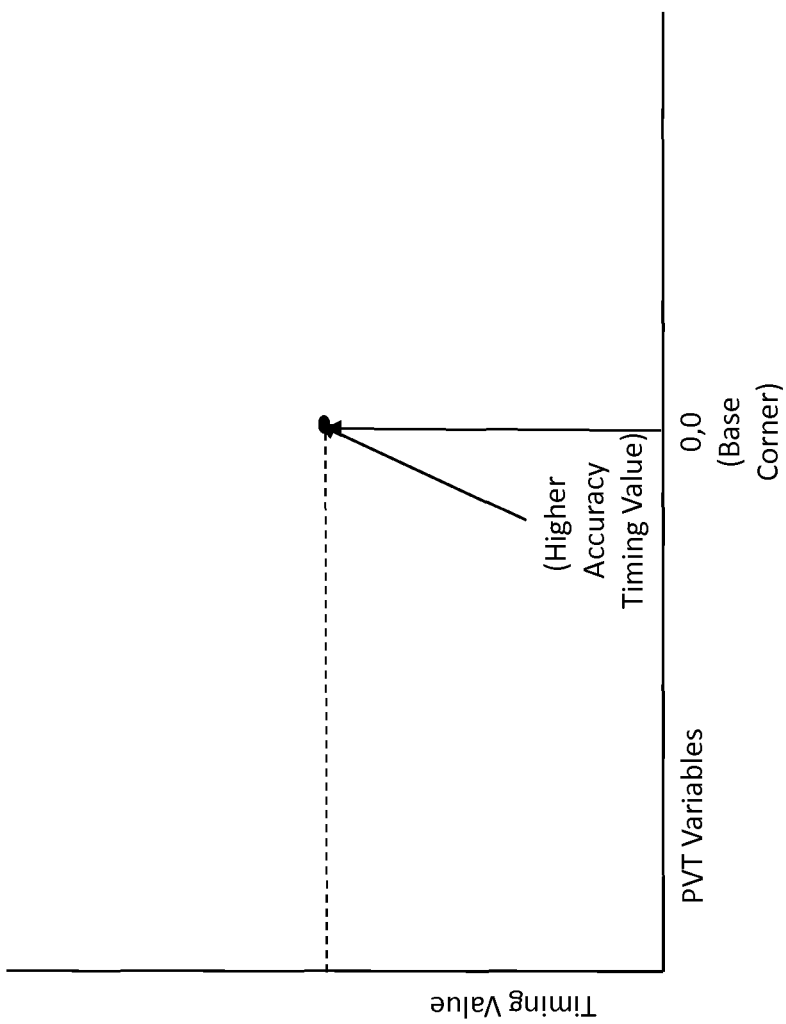
FIG. 2 is a graph showing timing values versus PVT variables illustrating aspects of systems and methods herein.

The processing performed herein is also illustrated in a graphic statistical distribution determined as shown in FIGS. 2-6. More specifically, FIG. 2 illustrates a very simplified two-dimensional graph with increasing timing values being represented along one access and changing PVT variables being represented along the other axis. Those ordinarily skilled in the art would understand that this extremely simplified two-dimensional graph does not fully represent timing values and PVT variables, and that such is only presented to illustrate some of the concepts disclosed herein.

Figure 3:
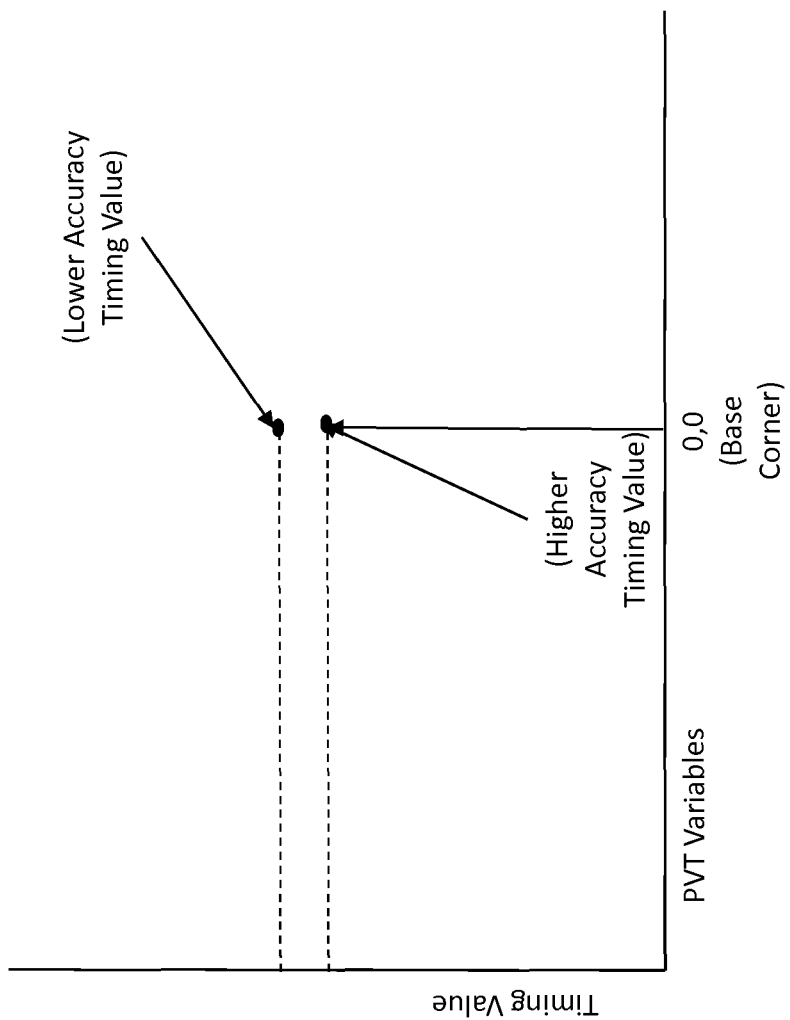
FIG. 3 is a graph showing timing values versus PVT variables illustrating aspects of systems and methods herein.

In FIG. 2, a higher accuracy modeling process is used to calculate a timing value for a specific base corner set of PVT variables (that is identified as axis position 0, 0 in FIG. 2). In FIG. 3, a relatively lower accuracy modeling process is used to calculate a timing value for the same specific base corner set of PVT variables (0, 0). Note that because of its lower accuracy, the lower accuracy modeling process produces a different timing value from the higher accuracy modeling process, as shown in FIG. 3.

Figure 4:
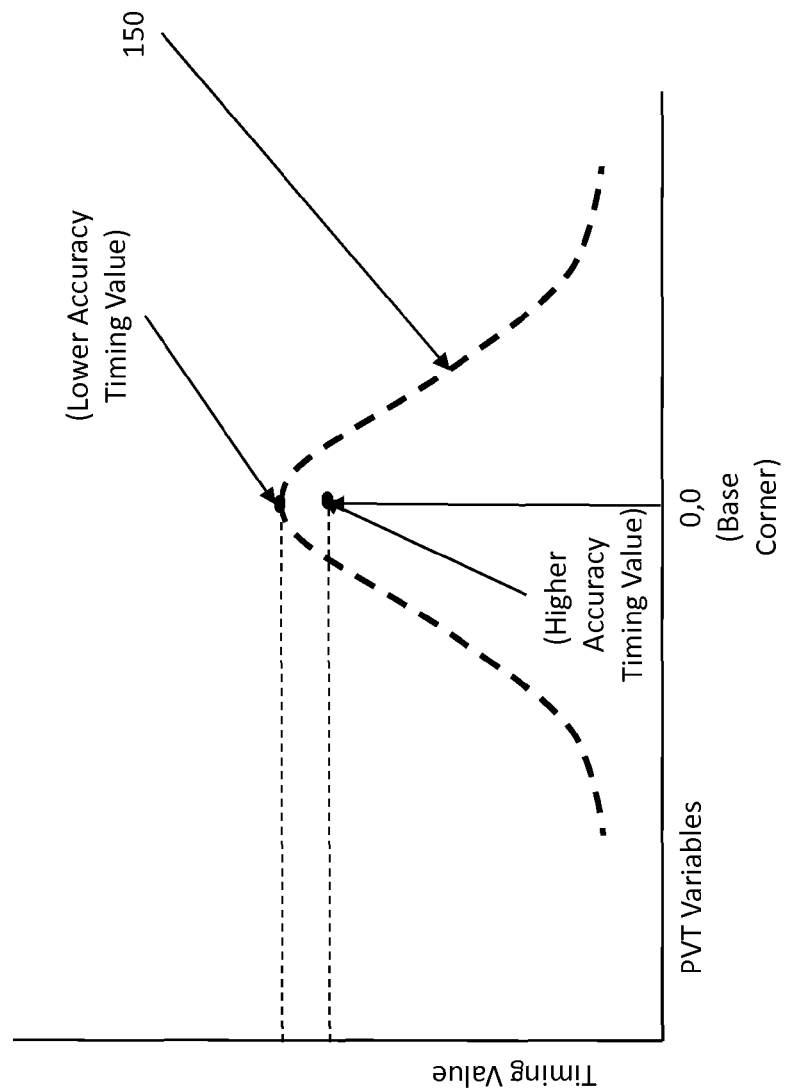
FIG. 4 is a graph showing timing values versus PVT variables illustrating aspects of systems and methods herein.

In FIG. 4, the systems and methods herein use the relatively lower accuracy modeling process to calculate different timing values for different PVT variables, and thereby determine finite differences between each of different timing values for different process corners (e.g., additional sets of PVT variables) relative to the base corner. Using these finite differences, the systems and methods herein can calculate the statistical sensitivity of the lower accuracy timing value to the additional sets of PVT variables, as represented by the lower accuracy distribution curve 150 show in FIG. 4.

Figure 5:
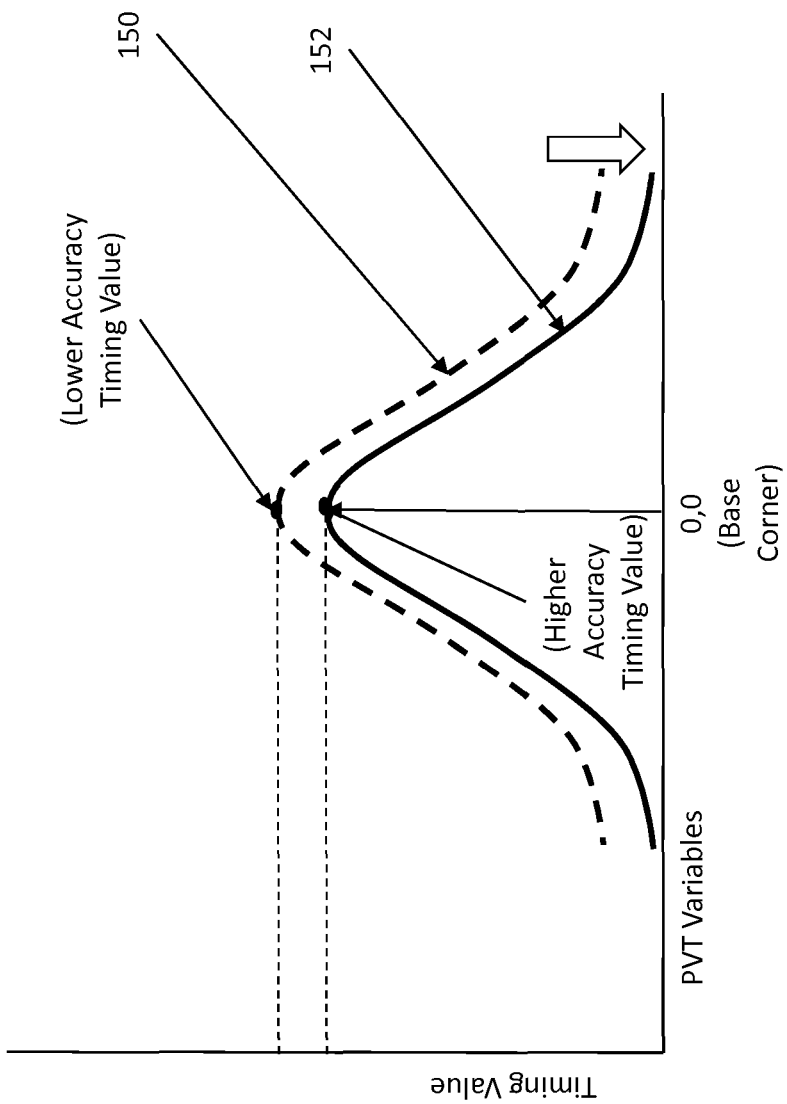
FIG. 5 is a graph showing timing values versus PVT variables illustrating aspects of systems and methods herein.
Figure 6:
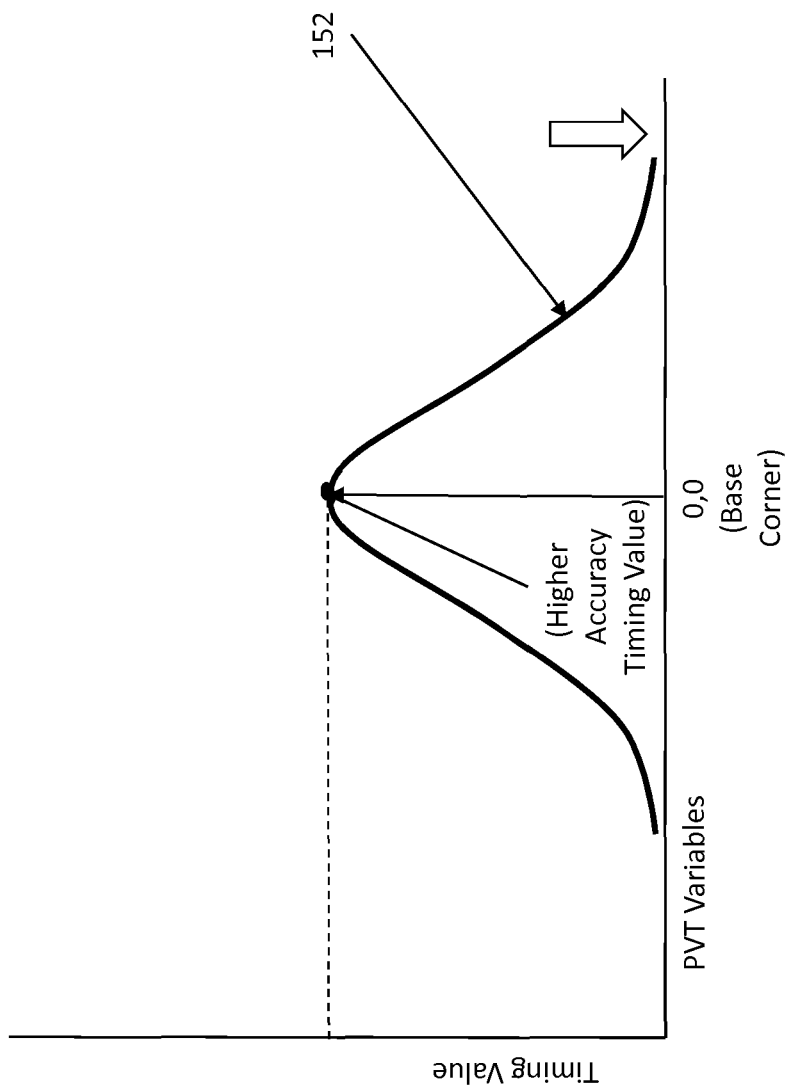
FIG. 6 is a graph showing timing values versus PVT variables illustrating aspects of systems and methods herein.
Figure 7:
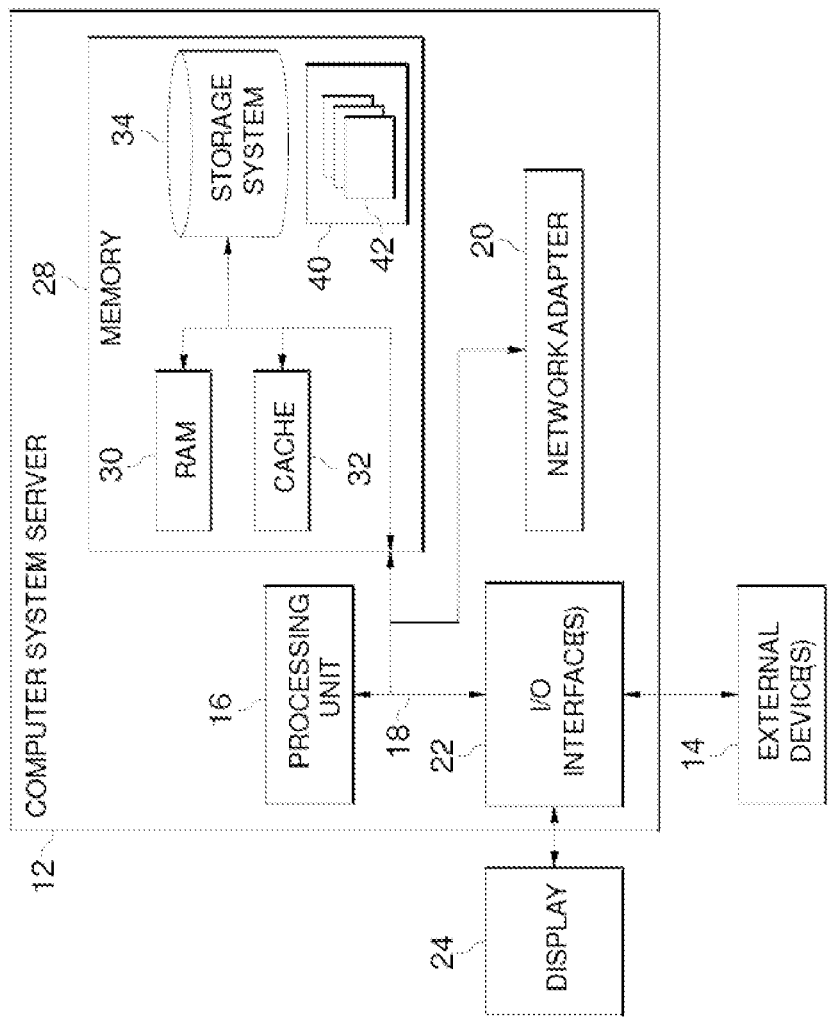
FIG. 7 is a schematic diagram showing exemplary systems herein.

As shown in FIG. 5, the systems and methods herein and then use the lower accuracy distribution curve 150 to calculate a distribution curve 152 that is centered on the higher accuracy timing value. In one very simplified example, all points on the lower accuracy distribution curve 150 can be adjusted by the difference between the lower accuracy timing value and the higher accuracy timing value in order to shift that the distribution curve 150 down to the position of the distribution curve 152. As shown in FIG. 6, this produces a highly accurate base corner timing value calculated using a higher accuracy modeling process (with a longer turnaround time) combined with a distribution curve 152 that was calculated with a lower accuracy modeling process (with a shorter turnaround time). As noted above, this solves the technical problem of balancing timing modeling accuracy against turnaround time by increasing accuracy without increasing turnaround time.

The methods as described above can be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A representative hardware environment (i.e., a computer system) for implementing the systems and methods herein is shown in FIG. 6. This schematic drawing illustrates a hardware configuration of an information handling/computer system in accordance with the embodiments herein. The system comprises at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed [systems, methods and computer program products] and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving an integrated circuit design into a computer;
   automatically computing a mean timing value of at least one portion of said integrated circuit design for a first set of manufacturing process variables, voltage variables, and temperature variables (PVT variables) using a first timing calculation, having a first accuracy and having a first time and computer resource cost, using said computer;
   automatically calculating a first timing value of said at least one portion of said integrated circuit design for said first set of PVT variables using a second timing calculation, having a second accuracy and having a second time and computer resource cost, using said computer;
   automatically calculating second timing values of said at least one portion of said integrated circuit design for additional sets of PVT variables that are different from said first set of PVT variables using said second timing calculation using said computer;
   automatically calculating finite differences of each of said second timing values to said first timing value using said computer;
   automatically calculating a statistical sensitivity of said first timing value to said additional sets of PVT variables based on said finite differences using said computer;
   automatically calculating a statistical sensitivity of said mean timing value to said additional sets of PVT variables based on said statistical sensitivity of said first timing value to said additional sets of PVT variables using said computer; and
   automatically outputting said mean timing value and said statistical sensitivity of said mean timing value to said additional sets of PVT variables from said computer for use in modifying said integrated circuit design to improve operating speed and decrease malfunction of integrated circuits fabricated according to said integrated circuit design,
   said second accuracy being lower than said first accuracy, and
   said second time and computer resource cost being lower than said first time and computer resource cost.

2. The method according to claim 1, said automatically calculating second timing values further comprising using said first timing calculation for selected sets of said additional sets of PVT variables, based on said selected sets of said additional sets of PVT variables impacting accuracy of said statistical sensitivity of said first timing value.

3. The method according to claim 1, further comprising calculating said second timing values using said first timing calculation for selected portions of said integrated circuit design based on:
   physical elements of said integrated circuit design subject to relatively increased accuracy requirements; and
   hierarchical elements of said integrated circuit design subject to relatively increased accuracy requirements.

4. The method according to claim 1, said automatically calculating a statistical sensitivity of said mean timing value to said additional sets of PVT variables comprising:
   determining a distribution of said statistical sensitivity of said first timing value to said additional sets of PVT variables; and
   centering said distribution of said statistical sensitivity of said first timing value to said additional sets of PVT variables on said mean timing value.

5. The method according to claim 1, said outputting of said statistical sensitivity of said mean timing value to said additional sets of PVT variables comprising outputting a graph showing a distribution of said statistical sensitivity of said mean timing value to said additional sets of PVT variables centered on said mean timing value.

6. The method according to claim 1, said first time and computer resource cost and said second time and computer resource cost comprising turn-around-time (TAT).

7. The method according to claim 1, said first timing calculation and said second timing calculation comprising different circuit timing models.

8. A computer program product for performing statistical static timing analysis, the computer program product comprising a computer readable storage medium having program instructions embodied therewith, wherein the computer readable storage medium is not a transitory signal per se, the program instructions being readable and executable by a computer to cause the computer to perform a method comprising:

receiving an integrated circuit design into said computer;

automatically computing a mean timing value of at least one portion of said integrated circuit design for a first set of manufacturing process variables, voltage variables, and temperature variables (PVT variables) using a first timing calculation, having a first accuracy and having a first time and computer resource cost, using said computer;

automatically calculating a first timing value of said at least one portion of said integrated circuit design for said first set of PVT variables using a second timing calculation, having a second accuracy and having a second time and computer resource cost, using said computer;

automatically calculating second timing values of said at least one portion of said integrated circuit design for additional sets of PVT variables that are different from said first set of PVT variables using said second timing calculation using said computer;

automatically calculating finite differences of each of said second timing values to said first timing value using said computer;

automatically calculating a statistical sensitivity of said first timing value to said additional sets of PVT variables based on said finite differences using said computer;

automatically calculating a statistical sensitivity of said mean timing value to said additional sets of PVT variables based on said statistical sensitivity of said first timing value to said additional sets of PVT variables using said computer; and automatically outputting said mean timing value and said statistical sensitivity of said mean timing value to said additional sets of PVT variables from said computer for use in modifying said integrated circuit design to improve operating speed and decrease malfunction of integrated circuits fabricated according to said integrated circuit design, said second accuracy being lower than said first accuracy, and said second time and computer resource cost being lower than said first time and computer resource cost.

9. The computer program product according to claim 8, said automatically calculating second timing values further comprising using said first timing calculation for selected sets of said additional sets of PVT variables, based on said selected sets of said additional sets of PVT variables impacting accuracy of said statistical sensitivity of said first timing value.

10. The computer program product according to claim 8, said method further comprising calculating said second timing values using said first timing calculation for selected portions of said integrated circuit design based on:

physical elements of said integrated circuit design subject to relatively increased accuracy requirements; and hierarchical elements of said integrated circuit design subject to relatively increased accuracy requirements.

11. The computer program product according to claim 8, said automatically calculating a statistical sensitivity of said mean timing value to said additional sets of PVT variables comprising:

determining a distribution of said statistical sensitivity of said first timing value to said additional sets of PVT variables; and centering said distribution of said statistical sensitivity of said first timing value to said additional sets of PVT variables on said mean timing value.

12. The computer program product according to claim 8, said outputting of said statistical sensitivity of said mean timing value to said additional sets of PVT variables comprising outputting a graph showing a distribution of said statistical sensitivity of said mean timing value to said additional sets of PVT variables centered on said mean timing value.

13. The computer program product according to claim 8, said first time and computer resource cost and said second time and computer resource cost comprising turn-around-time (TAT).

14. The computer program product according to claim 8, said first timing calculation and said second timing calculation comprising different circuit timing models.

* * * * *